United States Patent [19]

Dahman et al.

[11] Patent Number: 5,440,686
[45] Date of Patent: Aug. 8, 1995

[54] SELECTING A DATA UNIT CANDIDATE TO BE DEMOTED TO A BACKING STORE FROM A FRONT STORE BASED UPON THRESHOLDS INDIVIDUAL TO EACH OF THE DATA CANDIDATES

[75] Inventors: Kirby G. Dahman; Kenneth F. Day, III; Alfredo M. Diaz, all of Tucson, Ariz.; Daniel A. Ford, San Jose, Calif.

[73] Assignee: International Business Machines Corporation, Armonk, N.Y.

[21] Appl. No.: 171,571

[22] Filed: Dec. 22, 1993

[51] Int. Cl.⁶ .............................................. G06F 12/00
[52] U.S. Cl. ................................ 395/164; 395/439; 395/444; 395/485; 395/494
[58] Field of Search .................... 395/164–166, 395/250, 425, 650; 364/200 MS File, 900 MS File; 360/48

[56] References Cited

U.S. PATENT DOCUMENTS

| | | | |
|---|---|---|---|
| 4,347,567 | 8/1982 | DeTar, Jr. | 364/200 |
| 4,420,807 | 12/1983 | Nolta et al. | 364/200 |
| 4,429,363 | 1/1984 | Duke et al. | 395/425 |
| 4,466,059 | 8/1984 | Bastian et al. | 364/200 |
| 4,575,827 | 3/1986 | Kulakowski | 365/230.01 |
| 4,636,946 | 1/1987 | Hartung et al. | 364/200 |
| 4,882,642 | 11/1989 | Tayler et al. | 364/200 |
| 4,891,784 | 1/1990 | Kato et al. | 364/900 |
| 5,025,431 | 6/1991 | Naito | 369/36 |
| 5,121,483 | 6/1992 | Monahan et al. | 395/275 |
| 5,132,853 | 7/1992 | Kulakowski et al. | 360/48 |
| 5,182,679 | 1/1993 | Nishimura | 360/48 |
| 5,197,055 | 5/1993 | Hartung et al. | 369/34 |

Primary Examiner—Mark R. Powell
Assistant Examiner—Kee M. Tung
Attorney, Agent, or Firm—H. F. Somermeyer

[57] ABSTRACT

A record media (optical disk) automatic library (back store) houses a plurality of record media for selective mounting in any one of a plurality of media drives (front store). Each record medium has one or more addressable recording surfaces termed data units. Record media currently mounted in said media drives may be replaced by other record media (demounted) only if the individual data unit has been idle (not accessed) for a time longer than a predetermined horizon time (demount eligibility threshold). If the current idle times for all mounted media are less than the respective horizon times, then no media can be demounted. Then, all proposed record media mounts are delayed until one of the currently mounted record media becomes eligible for demounting. If a plurality of mounted record media are eligible for demounting, then a least recently used one of the data units is demounted. The idle time of each mounted data unit is separately timed.

31 Claims, 3 Drawing Sheets

SELECTING A DATA UNIT CANDIDATE TO BE DEMOTED TO A BACKING STORE FROM A FRONT STORE BASED UPON THRESHOLDS INDIVIDUAL TO EACH OF THE DATA CANDIDATES

FIELD OF THE INVENTION

This invention relates to apparatus and machine-executed methods for managing promoted data in an automated data storage subsystem and, more specifically, to improved apparatus and methods for efficient selection of demotion data unit candidates.

BACKGROUND OF THE INVENTION

Modern computer systems require ever-increasing data storage capacities. A larger data storage capacity often increases random data access times to such stored data. Such increased access times can have a substantial negative effect on computer system performance and efficiency. Data access times can be improved by introducing a hierarchical data storage organization having a large back store and a higher speed front store. Such front-store/back-store arrangements have taken several forms and may include two or more levels in the data storage hierarchy. An improvement in total system performance can arise from an organization employing a small fast data store at the highest or front storage level and slower stores of increasing size and access time at lower data storage levels in the hierarchy in a manner well-known in the art. Such hierarchical organization is useful for optimizing the capacity, speed, cost and expandability of a data store and an associated computer system.

Modern computer peripheral data stores usually require very high capacity data storage apparatus at the lowest or backing level. Many peripheral large-capacity data-storage subsystems employ a automated data storage library. An automated data storage library includes an array of media-storing compartments or slots. A media transport mechanism automatically transports addressed data-storage media between the respective library slots and any one of a plurality of data recorders or drives. Each drive usually has a capability for reading and writing on each of the storage media that is mounted in such drive. Such automated data-storage library subsystems may take any one of a large plurality of configurations and exhibit a diversity of data-access performance.

Peripheral data storage hierarchies have used automated data storage library systems with diverse types of data-storage media, such as tape cartridges of all types and optical disks (write once and re-writable optical disks). The front stores for all of such systems control demotion of data units to a back store based upon data-accessing activity relative to all of the promoted data units resident in the front store. A commonly used demotion control is the widely-used "least recently used" LRU control. Such an arrangement does not separately nor individually consider any desired or needed accessing to individual ones of the promoted data units. As such, these prior art controls do not tend to optimize each residency time of each promoted data unit in a front store. That is, LRU controls are more likely to demote a data unit before an attaching using unit has finished with such demoted data unit than is desired.

Such known automated data-storage libraries include the IBM Corporation 3850 Mass Storage Subsystem (MSS) for the storage and retrieval of magnetic tape cartridges, circa 1975. The 3850 MSS employed a magnetic tape library as a back store and an array of direct access storage devices (DASD) as a front store. The 3850 MSS employed a data unit for promotion and demotion of eight cylinders of an IBM 3330 virtual disk volume. Such data unit is hereinafter termed a "segment". Before the 3850 MSS, several automated tape libraries had been constructed and operated with limited commercial success or in governmental installations. Following the 3850 MSS, several commercial automated media libraries have been marketed using magnetic tape and optical disk media. The media transport mechanisms of these libraries can transport one or more media, usually in a cartridge. An example of optical disk media library with which the present invention is most advantageously employed are the currently marketed IBM optical library subsystems.

All of such automated library subsystems exhibit a common trait that adversely affects access times (increases access time). The mechanical movement of each data-storage medium between a respective library compartment and peripheral drive takes seconds whereas the data transfers between such peripheral drive and an attaching using unit (host processor, network and the like) is at electronic speeds. Most of electronic speeds are orders of magnitude faster than the mechanical speed of media transport. Therefore, it is desired to reduce the negative effect of such mechanical media transfers. Such reduction can be best achieved by managing the mounting and demounting of the media for reducing necessity for mounting any of the media more than once for each set of accesses by any one or more job streams in the using unit(s) in a short time period, i.e. within an order of magnitude of media transport times, viz 10–20 seconds, for example. Because of vastly different application program job streams, peripheral data storage subsystems are subjected to a wide spectrum of data access requests. Accordingly, optimal mount times (time of residence in a front store) is desired for diverse ones of the media that varies with time of day and job streams requirements that are beyond the present description.

Random data-access request streams may result in frequent undesired data unit (optical disk) demounts and mounts. Such undesired mechanical activity of media transport keeps the media transport mechanism unnecessarily busy resulting in possibly severe system performance degradation. That is, the number of media transport operations per unit of data being access can become excessive to a point that system performance is unduly degraded by waiting for media transportation to complete.

On the other hand, sequential data access requests provide, at least momentarily, a high rate of data accesses to each data unit, i.e. disk or promoted data. It is desired to keep such a data unit promoted/mounted for the duration of such sequential data accessing. If a library controller does not distinguish between random and sequential data access activity, a sequentially-accessed optical disk cartridge can be prematurely demounted in favor of a recent random access mounting request. For this reason, the above-described global criterion based demoting/demounting controls do not provide an optimal demoting/demounting control. The resultant data unit transfer activity, termed churning, unnecessarily increases data transfer workload reducing data access efficiency. It is desired to accommodate the above-described situation.

In a multi-level data storage hierarchy, data are promoted to diverse levels depending on the current- (within a range of time measured in seconds, for example) job stream data access requirements and patterns. Such access times in the diverse levels can also have negative effects on total computer system performance. Therefore, it is desired to provide for improved data residency controls at all levels of the hierarchical data-storing structure.

Peripheral data-storage subsystems for the past several years often include electronic random-access cache memories for temporarily storing data to enhance access to data. Many known data promotion and demotion methods and apparatus control storage of data in a peripheral cache. It is also desired to provide an enhanced cache control method and apparatus that relies on individual access patterns to data units stored in a cache. Data units in a cache can be minimum allocation spaces, as will become apparent.

The term promote or promoting data units includes any action that moves a data unit, and some or all of its data, in any form to a higher level of the storage hierarchy. Such copying or moving may bypass a level of a storage hierarchy. In some data storage hierarchies, such bypassing is not a part of the hierarchy design. The term demote or demoting means any action for moving a data unit (and its contained data) from a given level to a lower level of a data storage hierarchy. Moving a data storage medium (a form of a data unit) from a library storage compartment for mounting on a media drive is promoting data recorded on the medium to the drive level of a data storage hierarchy. Demounting a storage medium from a media drive is demoting that data unit to a library cartridge storage compartment. Similarly, electronically copying data from a data unit (an addressable portion of a data storage medium) to a cache from a data storage medium mounted in a media drive is a promotion of such data unit. Such data unit promotion provides a copy of the data in such promoted data unit in both the front and back stores. Copying data stored in a cache to a mounted storage medium in a media drive without removing the data unit from a cache does not change the promoted status of the data of the cache resident data unit. A demotion of a cache resident data unit to a mounted storage medium results in the data of the data unit being removed from the cache. A copy of the data in such demoted data unit is stored in the mounted storage medium. The term "data unit" is used herein to indicate an addressable data storage unit (virtual or real medium, area of a RAM, and the like) for storing data. By way of example, data units include disks, each data recording surface of a disk, magnetic tape, virtual volumes of all types, disk tracks, disk cylinders and groups of all of the above. A data unit need not be filled with data. The data unit is promoted that carries or promotes the contained data. A data unit can be promoted even though empty. Also, in general, the data capacity or size of a data unit being electronically promoted is smaller than the data capacity or logical size of a data unit being moved.

In accordance with all of the above it is desired to provide apparatus and methods for optimizing time that a data unit is promoted to a front store. Such optimization should include criteria based upon data accessing to each promoted data unit independently of data accessing to other promoted data units. Such apparatus and methods can provide controls to ascertain a best or optimal front store resident time after which each individual promoted data unit can be demoted. Before such optimal time, such data unit is not to be demoted unless explicitly commanded to do so.

In both cache front stores and media drive front stores, data units promoted to a front Store are automatically selectively demoted to a back store. In the case of an automated library, disk/tape media are automatically demounted. Such demounting/demoting controls have generally used a so-called global criteria that indicates relative data-accessing activity of all promoted data units relative to each other. The individual activities of the promoted data units with respect to their own respective needs is not considered. A commonly used demoting control is the above-discussed and well known least recently used (LRU) control. This algorithm demotes data units before data-accessing to such demoted data unit may have been completed. Such pre-mature demotion results in undesired and unwanted data unit demotion and promotion activity in a data storage hierarchy.

Another criterion used for automatically controlling data unit demotion is of least recently mounted (LRM), i.e. the data unit that was first promoted/mounted to a front store is the first to be demoted/demounted. Such data unit demotion control may also result in a premature demotion. Significant unnecessary data access delays can result. Such data-access delays not only included re-promoting/remounting the data unit, but also prioritizing such re-promoting/remounting with unrelated data promoting and media mounting. The character of this problem varies dynamically with current job stream requirements, such as whether the data access requests are primarily sequential (e.g., batch transfers) or random (such as experienced in a system intended to emulate a randomly addressed and accessed store, such as disk data storage units).

It is desired, for enhancing hierarchial data storage performance, to avoid the above-mentioned global limitation of selecting demoting(demounting) data units. Such a desired data storage hierarchy includes individual or local demotion criteria relating only to each promoted data unit independently of applying such individual or local criteria to any other promoted data unit. Such a desired demotion control system whether or not each data unit should be demoted or demounted initially based on current system accessing patterns of that individual data unit, i.e. data units eligible for demotion. Once that local criteria are met, then sequencing the demotion of eligible promoted data units ensues.

DISCUSSION OF THE PRIOR ART

A prior magnetic tape demounting control is illustrated in U.S. Pat. No. 4,864,511 by Michael E. Moy et al. This patent shows a data storage and retrieval subsystem employing an automated tape cartridge library having a so-called split controller architecture that permits the library management controller to operate transparently to the host computer, thereby eliminating the host computer processing overhead associated with media transport controls. This patent does not address how to manage a front store for minimizing moving media between storage compartments (back store) and media drives (front store) for maintaining high efficiency in the data processing system.

In U.S. Pat. No. 4,987,533, Connie M. Clark et al show a method for managing a storage hierarchy that incudes an automated optical disk library. Clark et al teach a Least Recently Mounted (LRM) globally-based demoting decision method for demoting optical disks to an external manually-operated shelf storage.

Christopher J. Monahan et al in U.S. Pat. No. 5,121,483 disclose another data-storage medium demounting method for servicing a medium mount request for an automated data storage library. Monahan et al teach a "virtual medium" method that permits the temporary demount of an active data storage medium that is subsequently remounted on any subsequently available media drive. Monahan et al also teach a preemptive demounting procedure that selects for preemptive demounting the LRM member of an "eligible subset" of all occupied media drives. Their "eligible subset" consists of all occupied media drives that are inactive (idle) longer than a predetermined time interval. The idle time interval is the same for all of the media drives. However, Monahan et al neither Consider nor suggest methods for dynamically optimizing their mount/demount request servicing procedures in response to changes in dynamically changing current patterns of the data access requests from using units (host processors).

In optical disk automated library subsystems, it is desired to emulate data access characteristics found with fixed-spindle disk data-storage units, also termed DASD for direct access storage drive(s). For example, the IBM 3995 model 151 Automatic Optical Disk Library, currently manufactured and sold by IBM, is a read-write optical disk data-storing automatic library that emulates data access of an IBM 3390 fixed-spindle DASD (fixed spindle means that the data medium is not demountable from the media drive). Emulation of DASD data-access characteristics in an automated data storage library system introduces new problems for which solutions have been unknown in the art. A typical host processor job stream includes several data-access-request streams. Such data-access-request streams have different data access patterns and characteristics from each other. Also, depending on where in the host processor job streams each data-access request stream arises, such data-access-request streams dynamically exhibit different data access characteristics. That is, in one portion of a host processor job stream data accesses may be substantial sequential while in other portions of the host processor job stream data accesses may be random (non-sequential). Because of such dynamic changes in individual data-access patterns of promoted data units, it is desired to enhance demoting and demounting controls for accommodating such individual dynamic data access changes.

Several cache data residency controls are known. Nolta et al in U.S. Pat. No. 4,420,807 shows a least recently used (LRU) data cast out control for a peripheral drive data cache. Two separate LRU controls are described. A first LRU control is used for casting out data that are stored in a backing disk storage unit in so-called good or usable areas. A second LRU control is used for casting out data that are addressed by attaching host processors in defective areas. Such second LRU controlled data are stored in alternate areas of the disk storage unit. The arrangement is such that the second LRU cast out data have a longer residence in the cache than the first LRU cast out data. The reason for longer cache residency is the dual seeks required to access data stored in alternate storage areas of a back store. The Nolta et al described cache control does not address how data accessing to individual promoted data units in the cache can affect system performance by premature demotion of promoted data units.

Tayler et al in U.S. Pat. No. 4,882,642 show detecting sequentially processed data that are stored in a cache attached to a backing store having a plurality of disk data-storage drives. Tayler et al generate a so-called data promotion factor (indicates a number of tracks of data that are to be promoted to cache in anticipation of use by a host processor) relating to how fast the sequential data are being processed through the cache. Tayler et al use a usual LRU cast out algorithm for casting data out of the cache. When data are to be cast out, such LRU identified data are cast out irrespective of probability of soon being accessed by a host processor that is not indicated by an LRU control. It is desired to provide a cast out control that is based in part upon characteristics of individual data units stored in a cache (front store).

M. Hartung et al in U.S. Pat. No. 4,636,946 show an LRU data demotion control for a cache attached to a back store of the disk data-storage type. A difference in the Hartung et al cast out control from other cache LRU controls is the accumulation from the LRU list non-LRU data that are stored in a backing disk store in a same cylinder of tracks. This grouping reduces head seeks in the disk data-storage drive for improving subsystem performance. When an unchanged copy of the demoted non-LRU data are left in the cache, then when such data are cast out, the unchanged cache copy can be merely erased for casting out the cache copy of the data.

Accordingly, there is a clearly-felt need in the art for improved methods of effective data promote/mount management in hierarchial data storage systems, both at a library level and at a caching level.

SUMMARY OF THE INVENTION

The present invention enhances operation of a data storage hierarchy by managing data unit promoting and demoting between a back store and a front store based upon individual data access characteristics of promoted data units in a front store. Therefore, it is an object of the present invention to provide a more optimal data unit promoting by selecting data units that have a greater probability of being referenced (accessed) furthest in the future than heretofore provided.

In accordance with a first aspect of the invention, data-accessing patterns to respective promoted data units (storage media, blocks of data, etc) is monitored for establishing a minimum front store residency requirement for each individual promoted data unit that is based upon the individual data-access patterns for the respective data units. Each promoted data unit is not eligible for demotion to the back store until its desired residence requirements have been met. Such eligibility requirements may defer promotion of data units from the front store. All promoted data units meeting or exceeding their respective front store residency requirements are demotable using a demotion control applicable to all demotion eligible promoted data units. Such control can be least recent usage (LRU), least recent mounted (LRM) (a form of first in first out FIFO demount scheduling), last in first out (LIFO) among other controls, least frequently referenced (LFR—lowest rate of accessing) or combinations thereof.

Some eligible data units may not be available for demotion. In this instance, a data unit that is not the most LFU, LRM, LRU etc is demounted in place of a first identified LFU, LRM, LRU, etc data unit. Such unavailability can be caused by a data unit that is one of two disk surfaces of an optical disk. If the data unit to be mounted is a disk surface of a disk having a mounted eligible disk surface to be demounted, then that eligible disk surface is demounted by "flipping" the disk over to mount the disk surface to be mounted irrespectively of a current status of its LFU status.

In accordance with a second aspect of the invention, automatic control of data unit movements between a back store and a front store includes promoting predetermined ones of the data units from the back store to the front store. In such promotion of a data unit, if mechanical, then usually no copy of the data in the data unit remains in a back store. In electronic data unit promotion of a data unit, a copy of data in the data unit usually resides both in the front and back stores. Such back store includes a data-storage media library apparatus, a media drive having a mounted data-storage medium or be an electronic data storage unit and the like. A front store, respectively for the above-listed back stores may include, by way of example, a set of media drives, a peripheral cache or a processor cache. Predetermined data access criteria for each of said data units for determining a time to demote a respective one of said data units from said front store to said back store are established. For example, each data unit may have a different idle time (low frequency of data accessing) required before such respective data unit is eligible to be demoted from a front store to a back store. If a plurality of data units stored in a front store are eligible for demotion because each data unit has a current idle time greater than a predictive idle horizon time (idle threshold), then data access patterns to the individual data unit indicate which of the candidates are to be demoted. A least frequently used (LFU), least recently used (LRU), etc. data unit can be used to select which of the eligible data units are to be demoted. The data accessing of each of the promoted data units is separately monitored for respectively detecting and memorizing in a data store said individual data access patterns.

A received data access request that cannot be responded to because a data unit identified in the data access request is not in the front store triggers looking for a data unit promoted to the front store that has been idle longer than its respective idle horizon time (data unit is eligible for demotion). If such an eligible promoted data unit is found, then it is demoted. Then a data unit identified in a received data access request is promoted from the back store to the front store. The idle horizon time for the demoted data unit is recalculated. The recalculation of idle horizon time is based upon an elapsed time period (lowest data access frequency) between logical demount (selection for physical demount) and another event. Such other event may be physical demount after logical demount or a predetermined elapsed time in which data access patterns of mounted data units is analyzed.

If, in responding to a data-access request requiring promoting a data unit, no promoted data unit has an idle time greater than its respective idle horizon time (no promoted data unit is eligible for demotion), then any access request needing a data unit to be promoted is deferred until at least one of the currently promoted data units in the front store becomes eligible for demotion (a promoted data unit has a current idle time greater than its idle horizon time). Such deferred data unit promotion includes periodically sensing for a promoted data unit in the front store that is eligible for demotion. Then, such promoted data unit is demoted (cast out) from the cache and the deferred access request is honored.

The foregoing and other objects, features and advantages of the invention will be apparent from the following more particular description of preferred embodiments of the invention, as illustrated in the accompanying drawings.

DETAILED DESCRIPTION

Figure 1:
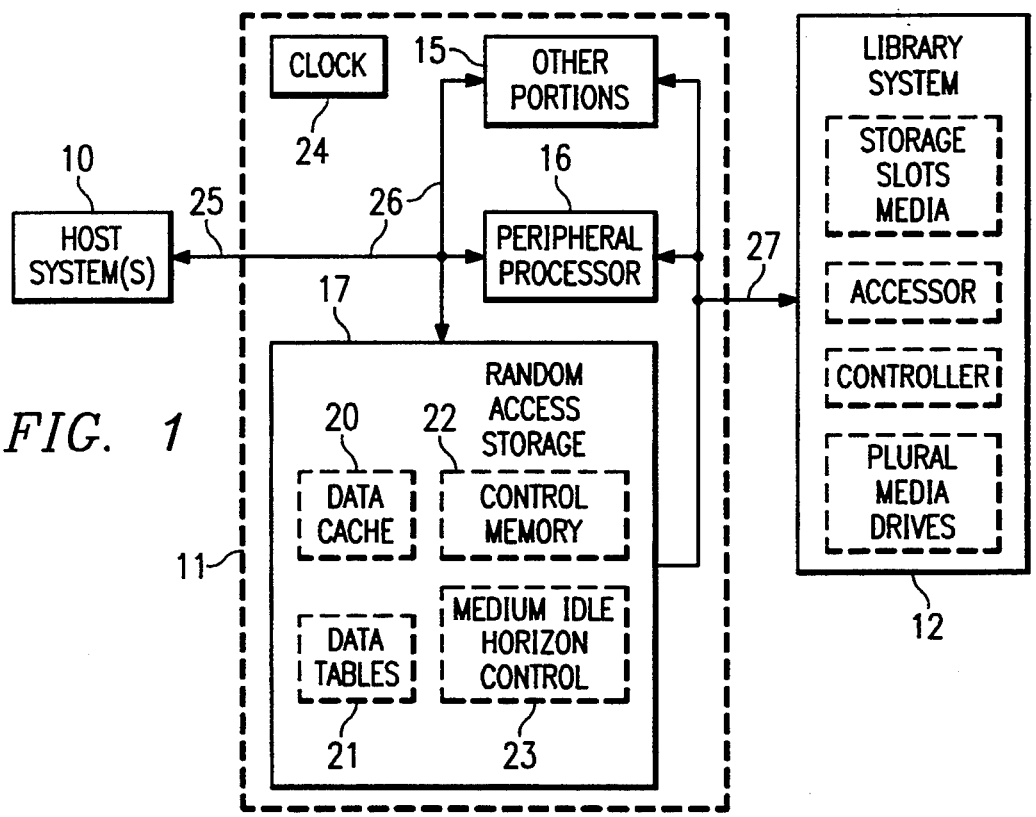
FIG. 1 illustrates in simplified block diagram form a data storage subsystem incorporating the teachings of the present invention.

Referring now more particularly to the appended drawing, like numerals indicate like parts and structural features in the various figures. FIG. 1 shows a host system (host processor, network, etc.) 10 attaching peripheral controller 11 for initiating and controlling data transfers with data-storage media of library system 12. Library system 12 includes the usual storage slots or compartments for respectively storing one or more transportable data-storage media. In a constructed embodiment of this invention, such transportable media comprised magneto-optical disks (not separately shown) enclosed in a suitable cartridge housing. Such known data storage disks are automatically transported between its library compartment or slot and any one of a plurality of usual optical disk drives within library system 12. It is preferred that such optical media be 133.35 mm diameter disk media. Library system 12 also includes a usual library controller (not separately numbered). Under control of a library system 12 Controller, a media accessor transports the optical media between the storage slots and the media drives. Peripheral controller 11 actuates library system 12 over cable 27 in a usual manner. Since library system 12 can consist of any known automatic library construction and control arrangement, for brevity such details are omitted from this specification.

Peripheral controller 11 is attached to host system(s) 10 via input-output channel 25, such as one that includes an optical fiber connection. The usual attachment circuits (not separately shown) are included in peripheral controller 11 and host system(s) 10. Peripheral controller 11 includes "other portions" 15 that represent usual automatic data paths, diagnostic circuits and programs, sequencing controls and the like. Peripheral processor 16 is connected to random access storage unit 17, other portions 15 and input-output channel 25 via connection 26. Random access storage unit (RAM) 17 includes control memory 22 for storing programs for operating subsystem 11-12 under programmed control of peripheral processor 16. Data cache 20 in RAM 17 caches data for the media drives of library system 12. Instead of practicing the present invention, usual data promotion and cast out are used for operating data cache 20. Data tables 21 provide status memorization for subsystem 11-12 control. These tables include the data Structures shown in FIG. 3 for operating the present invention in the FIG. 1 illustrated system.

Figure 2:
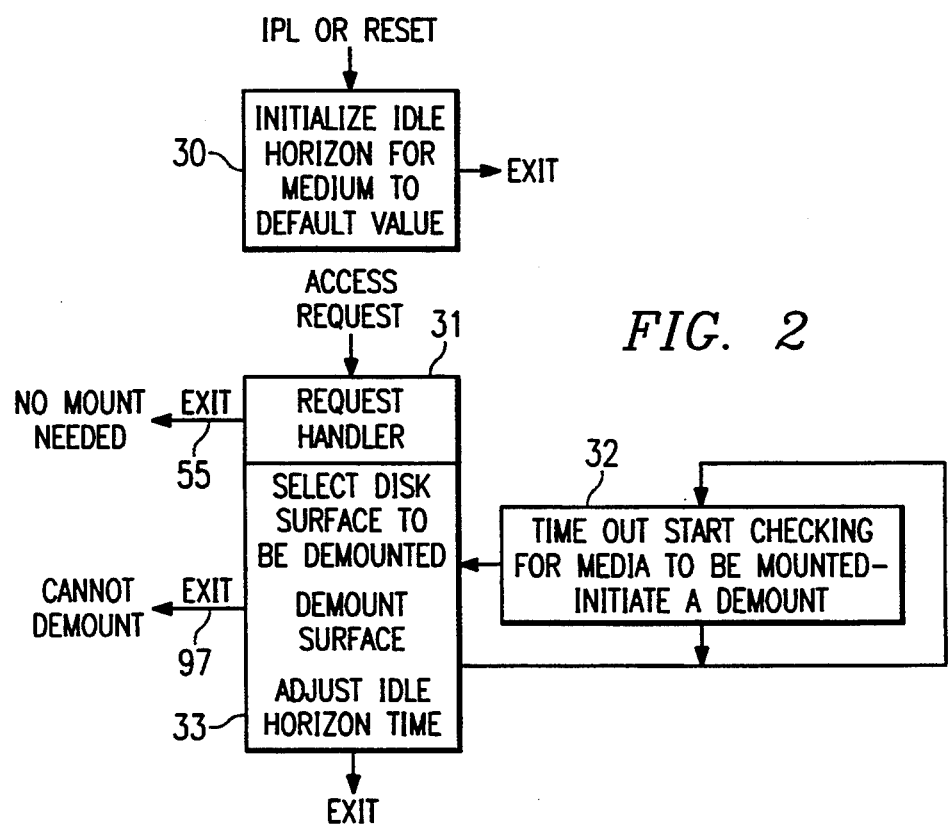
FIG. 2 is a simplified flow chart of program-controlled procedures in the FIG. 1 illustrated subsystem for showing a practice of the present invention.
Figure 4:
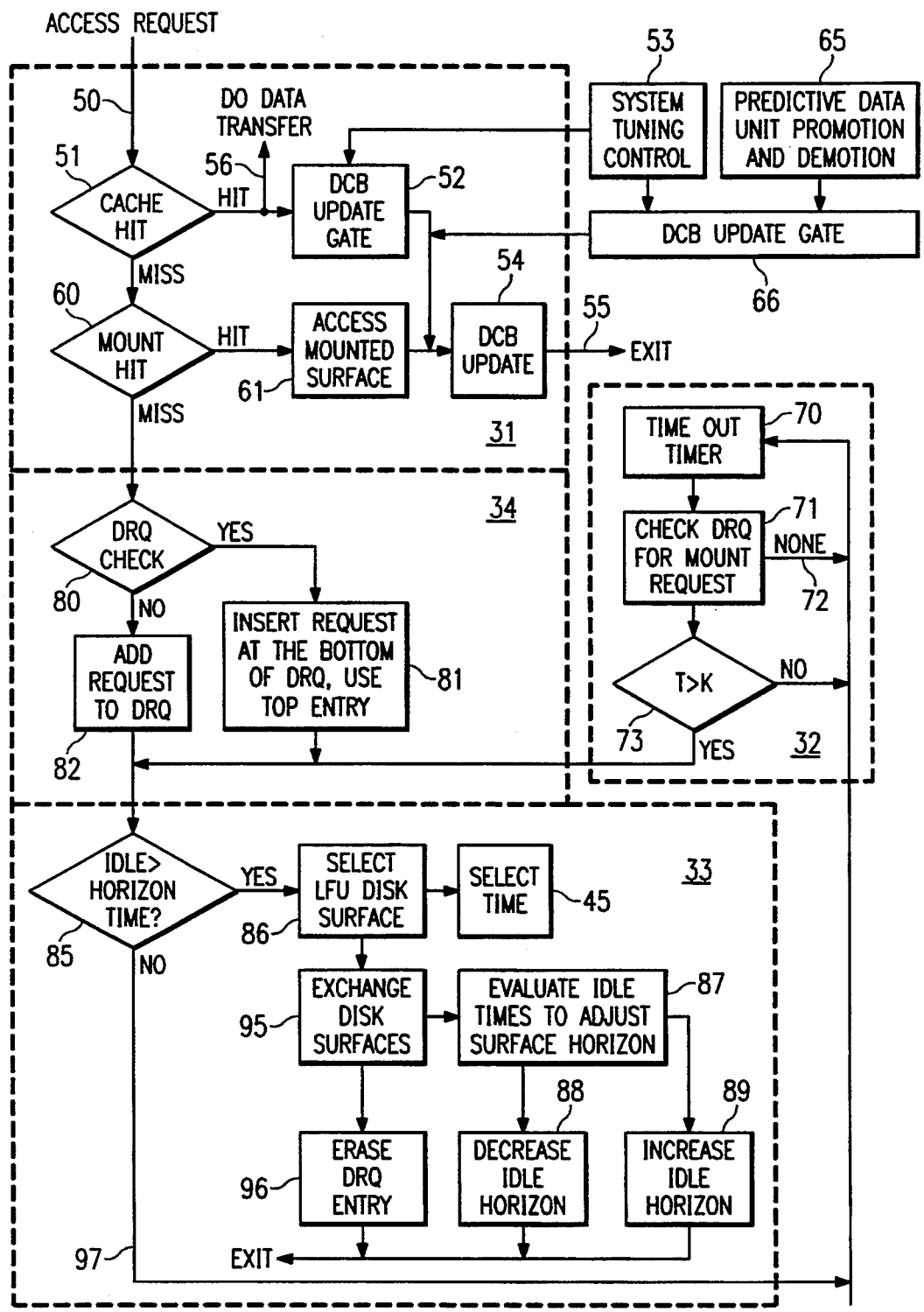
FIG. 4 is a simplified flow chart of program-controlled procedures in the FIG. 1 illustrated subsystem showing detailed operation of the illustrated embodiment.

In accordance with the present invention, an idle horizon program-implemented control 23 is embedded in RAM 17. FIGS. 2 and 4 illustrate the construction and operation of control 23 in a simplified flow chart form. Peripheral controller 11 also includes the usual clock 24 for synchronizing its operation and for generating time of day indications for time stamping selected machine operations in subsystem 11-12.

Subsystem 11-12 defines a data unit as a disk recording surface. Each optical disk has two recording surfaces. Since media drives of library system 12, in the illustrated embodiment, have but one transducer (optical lens system—not separately shown), only one recording surface can be accessed on a mounted two-sided disk. Therefore, the terms mounting and demounting disk surfaces (data units) is used throughout this description. The mounted disk surface is that disk surface facing the one transducer. The other disk surface, even though physically in a media drive, is not mounted for data accesses since it cannot be accessed for data recording, reading nor erasure.

FIG. 2 illustrates the program operational elements of the invention as practiced in the FIG. 1 illustrated subsystem. Such program elements are hereinafter termed "elements". Initialization element 30 responds to an initial program lead (IPL) (such as at power on time) activity or a system reset to initialize all of the idle horizon time values. Initialization element 30 stores the initialized values in hereinafter described horizon value table 43 (FIG. 2) for all of the library 27 contained media (all media maybe stored in respective ones of the library compartments or be in any of the media drives). Such initialization includes creating later-described data structures shown in FIG. 3 and stored in RAM 17 tables 21. In such initialization, each one of the disk surfaces has its own idle horizon time equal to N seconds, where N is a number preferably not greater than ten. The term "Idle Horizon Time" signifies that before any currently mounted disk surface is eligible for demotion from a media drive to a cartridge storing compartment in library system 12, its measured current idle time (time with no data accesses, as later defined) must exceed its current idle horizon time. As will become apparent, the idle horizon times are individually adjusted for each disk surface to control subsequent demotion activities for optimizing each media mount in the respective media drives of library system 12. Upon initialization element 30 completing its initialization, IPL processing proceeds in a usual manner.

Therefore, in accordance with this invention, a minimum desired residency time of each promoted data unit in a front store is the total time during which data-accesses to such data unit are repeated more often than the established idle horizon time (representing a minimal data access frequency) for such data unit. Only after data-accesses diminish based on prior data-accessing patterns is the idle horizon time exceeded for making such data unit eligible for demotion.

Once IPL or system reset has been completed, usual data processing activities ensue. Such data processing activities include accessing library system 12 media for mounting in and demounting from the library system 12 media drives. Such mounting and demounting operations are well known and not separately described herein. The operation of the present invention affects the timing and sequencing of such mounting and demounting, as will become apparent.

Controller 11 responds to each host system data access for a volume of data via request handling element 31 and demount element 33 (FIG. 2 but detailed in FIG. 4). Included in the controller 11 response is a determination of whether or not an addressed portion of a host system 10 volume of data is mounted in one of the media drives. The term "volume" means a host system defined logical volume. In an early constructed version of the FIG. 1 illustrated subsystem, one host volume is assigned to three optical disks, each disk having two recording disk surfaces. The optical disk surfaces are identified and addressed by the compartment address of the compartment storing the optical disk, modified by A and B. Letter A indicates a first one of the recording surfaces while letter B indicates the other recording surface. Controller 11 responds to the host system volume identification to identify which recording surface of which disk is to be accessed, i.e. identifies the data unit to be accessed. Such response includes a usual logical to real address translation not pertinent to an understanding of the present invention. Since host system 10 has no knowledge of the media library system 12, all of the host system 10 addressing is by its own logical volumes, such as previously provided in the IBM 3850 MSS for magnetic tape data storage.

Request handling element 31 checks whether or not the controller 11 identified disk surface is mounted (mounting a disk surface means that the disk is physically mounted in a media drive and the addressed surface is facing the optical sensing apparatus of the disk mounting media drive). If the addressed disk surface is not mounted, one of the currently mounted (promoted) disk surfaces (data units) is to be demounted. The selection of which disk surface is to be demounted is made in accordance with the present invention. If the disk surface to be demounted is on the same disk as the disk surface to be mounted, the same procedures are used, as later described.

Request handling element 31 finding that the addressed disk surface is currently mounted, then machine operations proceed over path 55 to operations not pertinent to this description. Otherwise, request handling element 31 requests demount element 33 to demount one of the currently mounted disk surfaces. Demount element 33 responds to request handling element 31 requested disk surface demount in accordance with the present invention by first determining whether or not any mounted disk surface is eligible to be demounted. Demount element 33 upon finding that none of the currently mounted disk surfaces are eligible for demounting (demotion), i.e. their current idle times are all less than their respective idle horizon times, then demount and mounting activity is delayed. Such delay is initiated by machine operations following path 97 for retaining a copy of the current mount request in a mount queue termed deferred request queue DRQ 43, as will become apparent. If a currently mounted disk surface has a current idle time exceeding its respective idle horizon time, then a later described procedure demounts such mounted disk surface and mounts the controller 11 requested disk surface. Demount element 33 also controls logical demount (selection of a disk surface to be demounted) and physical demount from a media drive of a selected one of the eligible disk surfaces. Such selected disk surface is hereinafter referred to as an available LFU disk surface.

The third or global element 32 of the illustrated embodiment of this invention repeatedly senses DRQ 43 (FIG. 3) for an entry indicating a deferred request for a disk surface mount. If the repeated sensing finds no such DRQ entry deferred mount request, no action occurs. Each time such sensing of DRQ 43 finds an entry, then global element 32 activates demount element 33 to determine whether or not any mounted disk surface is eligible for demounting, then determine which of the eligible disk surfaces is to be the available LFU disk surface and to update the idle horizon time for the available LFU disk surface.

The automatic demotion controls illustrated in this specification can be explicitly overridden without departing from the spirit of this invention. For example, explicitly commanding pinning (not eligible for demotion) a promoted data unit in a front store for reasons beyond the present description is within the spirit of the present invention. A commanded demount of a mounted disk surface is designated as a next disk surface to be demounted, i.e. the later described selection of a mounted disk surface based on eligibility and least frequent usage (LFU) is dispensed with for responding to the commanded demount.

Figure 3:
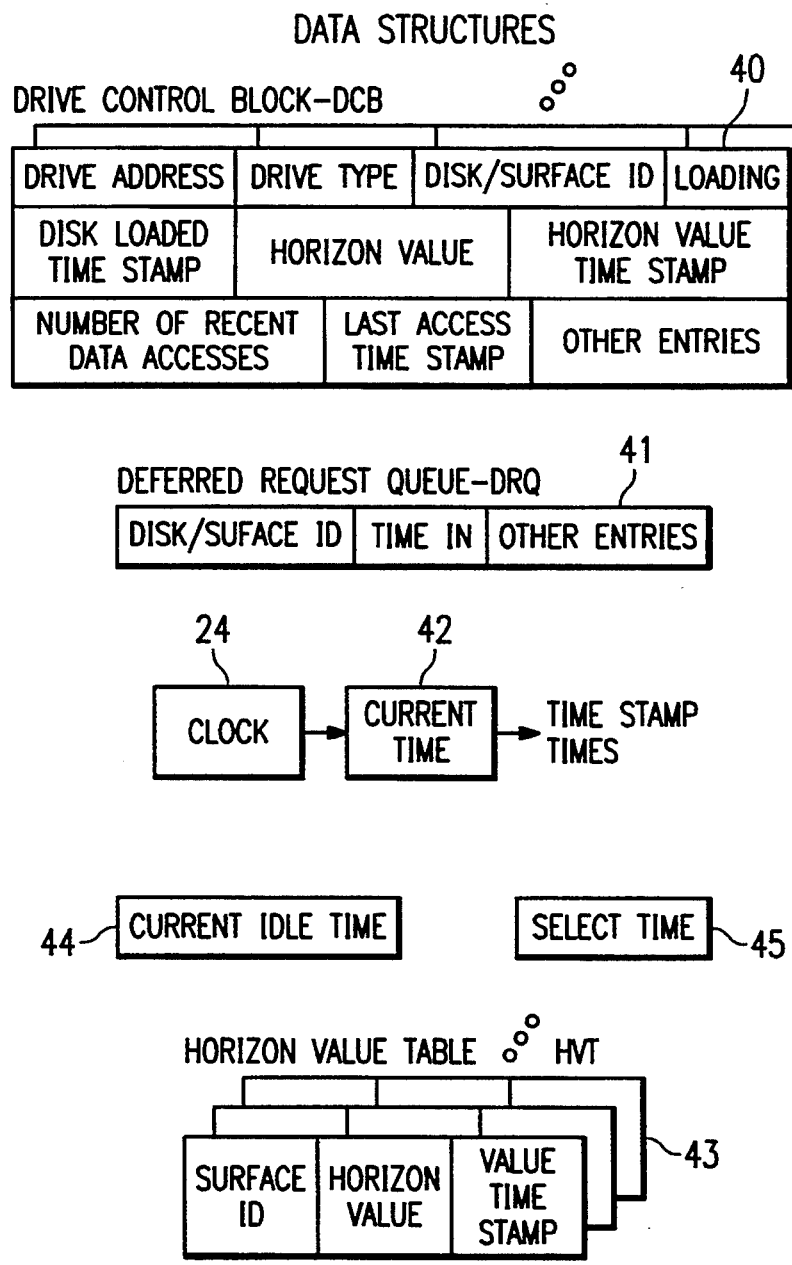
FIG. 3 diagrammatically illustrates data structures of the FIG. 1 illustrated subsystem used to practice the present invention in a best mode.

The FIG. 3 illustrated data structures are used in practicing the invention in a preferred form. RAM 17 in data tables 21 stores the illustrated data structures. The illustrated data structures are generated during IPL by initialization element 30 using known table generation processes. There is one drive control block DCB 40 for each of the media drives in library system 12. DCB 40 may include a drive address field. A simpler DCB is provided by establishing known offset addressing to access a DCB corresponding to the media drives and dispensing with the drive address field. Drive type field is useful in a multi-media library (tapes and disks for example) or if some of the media drives can access both disk recording surfaces (simultaneously mount both surfaces) while other media drives can data access only one surface (mount but one surface at a time). The present description assumes that all media drives access only one surface of a mounted disk. The field "disk/surface ID" contains the library storage compartment address of the currently mounted disk and indicates A or B for indicating which of the two disk surfaces can be accessed for reading, recording and erasing(which disk surface A or B is mounted). The field "loading" indicates that no disk surface is mounted but that library system 12 is currently transporting a disk from its library storage compartment to a media drive corresponding to the DCB. Field "disk loaded time stamp" contains the clock 24 time when the disk surface was physically mounted in a media drive. Field "horizon value" stores a current idle horizon time for the respective disk surface mounted in a media drive. Field "horizon value time stamp" indicates the subsystem clock 24 time that the horizon value was last generated. Such time stamp also indicates the last time the disk surface was demounted from any of the media drives. Field "number of recent data accesses" stores a running total of the number of accesses to the mounted disk surface since its mount time indicated in field "disk loaded time stamp". Field "last access time stamp" stores the clock 24 time that the last or most recent data access occurred to the respective mounted disk surface. Current idle time of each mounted disk surface is indicated by the time difference in register or storage location 42 and the time stamp value in,the "last access time stamp" field. Each DCB may contain other entries not pertinent to an understanding of the present invention.

Deferred request queue (DRQ) 41 stores controller 11 generated disk surface mount requests until one of the media drives is available for receiving the requested disk surface. DRQ 41 has field "disk/surface ID" that identifies the disk surface of an optical disk and which of the two recording disk surfaces is to be mounted. The "time in" field stores a time stamp indicating when the entry in DRQ 41 was made. Other fields may also be included in each entry of DRQ 41. DRQ 41 is a first-in first-out (FIFO) queue.

The current clock time is generated in clock 24 then lodged in register 42. All time stamps are generated by reading register 42.

Horizon Value Table HVT 43 includes one entry for each data-storage medium in the subsystem. HVT 43 includes field "surface ID" that stores identity of each disk surface. Field "horizon value" stores the last calculated elapsed idle time value for the respective data-storage surfaces. When a data-storage surface is mounted in a media drive of library system 12, the respective HVT 43 entry is read with the contents of the "horizon value" field being inserted into the "horizon value" field of an appropriate DCB 40 along with the contents of HVT 43 field "value time stamp" into the DCB 40 field "horizon value time stamp".

Current idle time register 44 stores the elapsed idle time of a later-described available LFU disk surface. Such available LFU disk surface is the disk surface to be next demoted to its storage compartment or to an unmounted position in the same media drive.

Select time register 45 stores the clock 24 time when an available LFU disk surface was selected for demotion. Select time is used in altering the idle horizon time of the LFU disk surface, as will become apparent. Select time indicates the time of logical demount of an available LFU disk surface to be demounted.

FIG. 4 illustrates operation and program construction of elements 31–33 of FIG. 2. Request handling element 31 responds to a data access request 50 received from processor 16. Processor 16 generates the data access request in response to a host system 10 request for access to a host defined logical data-storage volume logical data address. Processor 16 accesses a usual address translation table (not shown) for translating the host logical volume internal logical address into a subsystem address (real address). Such subsystem address includes the disk and surface ID. Access request 50 is for a data area within a disk surface indicated by the disk surface ID.

In responding to the processor 16 issued request for a data access to an addressed disk surface, cache hit element 51 first checks the data cache 20 directory (not separately shown) for ascertaining whether or not data cache 20 has data-storage space allocated for the subsystem address. If the answer is yes, then a cache hit has occurred. Request handling element 31 then enables the controller 11 to access data cache 20 in a usual manner as indicated by arrow 56.

DCB update gate 52 responds to system tuning control 53 for determining whether or not a cache hit is to be treated as a data access to the mounted disk surface. Such subsystem tuning control is preferably empirically determined. If such empirical determination in a given data processing environment indicates that data accesses to cache 20 have no substantial effect on the optimization of the residency of a disk surface in a media drive, then DCB update gate 52 is closed for preventing counting such cache accesses as disk accesses in DCB 40. On the other hand, if such empirical determination for a specific data processing environment indicates a substantial effect on optimizing at least some of the mounted disk surfaces, then DCB update gate 52 is opened for actuating DCB update element 54 to update DCB fields "number of recent data accesses" and "last access time stamp" to record the cache access count as a disk surface access. If cache hit element 51 detects a cache miss (no cache space in cache 20 is allocated for the data access request), then mount hit element 60 checks all DCB's 40 respective field "disk-/surface ID" for determining whether or not a disk surface having data-storage space allocated for the data access request is mounted. If the answer is yes, then access disk surface element 61 enables controller 11 access the identified mounted or promoted disk surface. DCB update element 54 then updates the appropriate DCB 40 fields "number of recent data accesses" and "last access time stamp" to reflect each data access. If mount hit element 60 determines that the requested disk surface is not mounted, it then actuates demount element 33 to determine, as later described, whether or not any of the mounted disk surfaces are eligible for demounting and then effect the demounting.

A variation of practicing the present invention is to count controller 11 instituted mounted disk surface accesses for the promoting data stored on the mounted to cache 20 in response of host system 10 data accessing patterns to ensure data are in cache 20 for future host system 10 data requests. Note that accessing a mounted disk surface in response to a host system request is always counted. This variation relates only to predictive data promotions. With this variation, it is also preferred to count cache hits as data accesses to disk surfaces. Any suitable predictive data promotion-demotion element 65 may be used. Update DCB gate 66 is selectively enabled by system tuning control 53. If DCB update gate 66 is enabled, then DCB update element 54 updates DCB 40 to add another disk access for counting each predictive data promotion or demotion as a mounted disk access. In a preferred form of the invention, predictive data promotions and demotions are not counted data accesses to any mounted disk surfaces.

Global element 32 repeatedly checks DRQ 41 for outstanding deferred requests to mount a disk surface. If a deferred mount request has been in DRQ 41 for more than K seconds, K in a constructed embodiment a time substantially longer than the default horizon time, then demount element 33 is directly actuated to test for a possible disk surface demount in the same manner that it tests for an eligible disk surface to be demounted in response to receipt of access request 50 by request handling element 31. The repeated scanning of DRQ 41 is initiated by time out timer 70 (a software timer) timing out each T seconds. T is an elapsed time about the duration of the initialization element 30 established default idle horizon time, such as one second. Each time timer 70 times out, check element 71 reads the top entry of DRQ 41. If the top entry is empty (no deferred mount requests), then time out timer is actuated to time another T seconds of elapsed time. Time-out element 73 compares the time stored in the DRQ 41 field "time in" with the current time stored in register 42. If the "time in" value $\leq K$, then no disk surface demount evaluation action is initiated. Time out timer 70 is restarted to time another period T. If the "time in" value $> K$, then time-out element 73 actuates demount element 33 to evaluate demounting one of the currently mounted disk surfaces. Alternately, time out timer 70 may be initiated every elapsed time T irrespective of other controller 11 machine operations.

It is also desired to sequentially respond to host system 10 requests in a same sequence as received by controller 11. Also, it is desired to promptly respond to every host system 10 data access request. Accordingly, it is desired for demount element 33 to respond most promptly to request handling element 31 indicating a need for a different disk surface to be mounted while ensuring that the current data access request is not responded to before prior deferred mount requests lodged in DRQ 41 are responded to. Since the operation of global element 32 is not synchronized to receipt of host system 10 requests, priority element 34 is interposed between elements 31 and 33. DRQ check element 80 receives and responds to each request handling element 31 request for a demount/mount operation to read DRQ 41. If a deferred mount request exists in DRQ 41, then, DRQ update element 81 stores the just received request in DRQ 41 (including time stamping the entry in a "last-in" position of DRQ), notifies processor 16 to respond to the host system 10 with a known channel command retry and fetches the top entry of DRQ 41 for actuating demount element 33 to test for mounting a needed disk surface. If DRQ check element 80 finds no current entry in DRQ 41, then DRQ add element 82 adds the received mount request to DRQ 41 as a top entry to be next processed. Each global element 32 request for mounting evaluation by demount element 33 bypasses priority element 34 to directly actuate demount element 33 for evaluating the disk surface mounting request (global element 32 issuing a request to evaluate a needed demount takes priority over any later received mount request).

In an alternate arrangement, all of the received host system 10 requests for disk surface mounts are stored in DRQ 41, then scanned by global element 32 for transmission to mount element 33. The alternative arrangement results in additional mounting delays of up to K seconds. If such an additional delay is not acceptable, then priority element 34 should be used. Also, if it is not required to process host system 10 requests in the order received, then priority element 34 may be dispensed with.

Demount element 33 responds identically to elements 31 and 32 requesting a demount evaluation and actuation. Decision element 86 receives each demount evaluation request. Decision element 86 responds to each received demount evaluation request to scan DCB's 40 to find a current idle time greater than a respective, idle horizon time value. For each DCB having a mounted disk surface (indicated in field "disk loaded time stamp"), element 86 subtracts the time value stored in the DCB "last access time stamp" from the current time value in register 42 to develop a current idle time value. Idle time element 85 compares each current idle time value with the respective DCB 40 "horizon value". If the current idle time value is greater than the horizon value, the mounted disk surface identified in field "disk-/surface ID" has been idle for more than its specified idle horizon time making it eligible to be demounted. If idle time element 85 finds none of the DCB's indicating a mounted disk surface eligible for demount, then machine operations follow path 97 to restart time out timer 70 to time another period T. Note that because of asynchronism of receiving host system 10 requests with operation of time out timer 70, the time for global element 32 to next send any mount evaluation request to demount element 33 may be delayed. As an alternative, time out timer 70 can actuate element 71 irrespective of any activity in controller 11.

If select element 86 finds at least one DCB indicating a disk surface current idle time exceeds its idle horizon time (indicates disk surfaces eligible for demounting), then disk surface select element 86 determines which of the eligible disk surfaces has the least frequent usage (LFU) of all eligible disk surfaces. If only one disk surface is eligible for demount, then that disk surface is the more LFU disk surface (availability for physical demount is yet to be determined). The LFU disk surface is identified by first generating LFU time periods by subtracting each DCB field "last access time stamp" from the current time value stored in register 42. Then, for each mounted surface, dividing the LFU time period into the number of disk accesses indicated in field "number of recent data accesses" to generate a "usage rate" of accesses per unit of time. All of the usage rates are then compared with the lowest value indicating which of the eligible disk surfaces is the LFU disk surface. Because each disk has two disk surfaces, the LFU disk surface may not be the best disk surface to demount. That is, if a disk surface to be mounted is on a disk having an eligible disk surface that is not the LFU disk surface, then such eligible disk surface becomes the available LFU disk surface. This LFU determination is time stamped in register 45 by select element 86 for indicating time of logical demount of the available LFU disk surface. For later use in increase idle horizon element 89, the actual idle time of the available LFU disk surface is memorized in register (tables 21 storage location) 44 (FIG. 2).

If a disk surface A to be mounted is on the same disk as one of the currently mounted disk surfaces B, then there are three possible situations. One, the surfaces A and B are on a disk having the current LFU disk surface, on a disk having a disk surface that is eligible for demount but not the LFU disk surface or on a disk having a mounted disk surface not eligible for demount. Select element 86 makes an availability for demount determination using a procedure set forth below.

Select element 86 upon identifying the LFU disk surface, reads the appropriate DCB 40 for fetching the disk ID of the LFU disk surface. Then, select element 86 compares the disk number (disk storage compartment address) with the disk number of the disk surface mount request in DRQ 43. If the disk ID is the same for both disk surfaces, then the disk surface to be mounted is on the same disk as the LFU disk surface. The disk exchange then reduces to "flipping" the disk such that the disk surface to be mounted faces the optical transducer. Such flipping is accomplished by the accesser fetching the disk from the mounting drive, rotating the orientation of the disk and reinserting the disk into the mounting media drive.

If the disk ID of the LFU disk surface is not the same as the disk surface to be mounted, then select element 86 scans all of the rest of the DCB's 40 for comparing all disk ID's of the non-LFU disk surface with the disk ID of the disk surface to be mounted. If the disk ID of the disk surface to be mounted is not the same as any disk ID in any one of the other DCB's 40, then the disk is stored in a library compartment and can be mounted as above described. However, if the disk surface to be mounted is on a disk having a mounted disk surface, then, if the mounted disk surface is not eligible for demount, the mount request is deferred. If the mounted disk surface is eligible for demount, then the disk having such eligible disk surface is flipped as set forth above to demount the mounted disk surface and mount the requested disk surface.

After deferring a mount request in this manner, select element 86 reads any second mount request in DRQ 43 for mounting. Such "out of received command sequence" mounting uses the procedures set forth above. Such a DRQ 43 scan of mount requests can continue until all mount requests have to be further deferred or one of the mount requests can be responded to. All of the procedures set forth above implement such exchange of disk surfaces in one media drive. In some instances, the available LFU disk surface is not the true LFU disk (from a global view), rather it can be any disk surface that is eligible for demounting.

The exchange of disk surfaces by demounting the available LFU disk surface and mounting the disk surface identified in the mount request is initiated in exchange element 95. Since automatic disk demounting and mounting a different disk is well known in the art, such details are omitted from this specification. Of course, such physical demounting requires copying data from cache 20 that is different from the medium copy of such data to the available LFU disk surface. Also, for a tape medium demounting requires first rewinding the tape into its cartridge while demounting a disk contained in a cartridge requires for the disk to 'spin-down' to a stop before demounting can occur. Other control and monitoring actions may be required in specific subsystems. During the exchange of disk surfaces, DRQ erase element 96 removes the disk surface to be mounted from DRQ 43. Such deferred mount request erasure occurs for all disk surface exchanges, whether by flipping the disk or fetching a disk from a library compartment.

After physical demount (hereinafter discussed in more detail) of the available LFU disk surface, the available LFU disk surface is identified to evaluate element 87 for adjusting the idle horizon value of the available LFU disk surface. Evaluate element 87 responds to the select element 86 identification of an available LFU disk surface by first ascertaining whether the idle horizon value is to be decreased or increased. Evaluate element 87 examines all of the DCB's for media drives mounting disk surfaces other than the available LFU disk surface for reading the respective fields "last access time stamp". If all of the other "last access time stamps" have a time value later than the select time stored in register 45, that fact indicates the selection of the available LFU disk surface for demount is the best possible disk surface for demotion. This fact indicates that all of the other mounted disk surfaces have a data access pattern with a data access frequency higher than the available LFU disk surface data access frequency. Therefore, the idle horizon time value for the available LFU disk surface is decreased. In one embodiment, such decrease is halving the time horizon value, then storing the halved value in HVT 43.

On the other hand, if less than all of the other mounted disk surfaces were not accessed since the select time stored in register 45, then one of the other mounted disk surfaces that was not accessed since logical demount of the available LFU disk surface (the register 45 select time) was a better candidate for demount. This analysis indicates that increasing the idle horizon time of the available LFU disk tends to optimize duration of disk surface mounts. In a constructed embodiment, a new idle horizon time value for the available LFU disk surface is calculated to be one half the sum of the current idle horizon time (contents of DCB 40 field horizon value) plus the last actual idle time (contents of register 44) of the available LFU disk surface. An alternative increase in idle horizon time value for the available LFU disk surface is to increase the idle horizon time of the available LFU disk surface equal to the last actual idle time value stored in register 44.

Upon completion of the recalculation of idle horizon time for the demounted (demoted) LFU disk surface, processor 16 stores the calculated idle horizon value in HVT 43. In this manner, the repeated adjustments of the idle horizon times for the respective disk surfaces in the FIG. 1 illustrated subsystem is dynamic in such a manner that the number of unnecessary or undesired disk surface mount (data unit promotion) and demounts (data unit demotions) is substantially reduced. In one test of this invention, the total number of mounts/demounts of disk surfaces was reduced by about 30% with an associated improvement in subsystem performance (higher effective data rate, reduced delays and the like).

When a physical demount of the available LFU disk surface has occurred can be indicated by any one of a plurality of demounting related events. For example, a fixed time delay after logical demount (select time in register 45), such as a time delay representative of an average time required to actually demount a disk surface may be used. Also when the usual disk spin down of the available LFU disk surface completes may be indicated as a physical demount time. A preferred event indicating physical demount is when the cartridge accessor receives the available LFU disk surface for transport, i.e. at the time the available LFU disk surface is actually ejected from the mounting media drive. Another physical demount time can be when the available LFU disk surface is in fact stored in its assigned library compartment or when the disk having the available LFU disk surface is flipped. Lastly, when the disk surface to be mounted is actually mounted in the media device ejecting the available LFU disk surface. Other criteria also may be used for timing calculation of each new idle horizon time. All of the above mentioned selections of time delays occur after logical demount of the available LFU disk(selection of LFU disk surface). Practicing the present invention is not limited to employing elapsed times after logical demount, rather a time period preceding logical demount or the available LFU disk surface selection may be used. A time period of media device activity before logical demount can be used by keeping a running number of recent data accesses in a predetermined time period can be monitored such that at the time logical demount occurs, a calculation of a new idle horizon time can be made. For example, a shift register (not shown) can be associated with each of the media drives. The shift register contents are open-end shifted synchronously to clock 24 at a predetermined rate. In this manner a constant elapsed time is represented by the current contents of all of the shift registers. At the time of the LFU disk surface selection by select element 86, all of the shift registers are simultaneously read for producing the relative frequency of data access information described above with respect to determining whether to increase or decrease idle horizon time of the selected LFU disk surface. Other arrangements and variations can be easily envisioned, such as having an elapsed time in the shift registers based upon disk accessing activity.

In applying the present invention to the IBM 3850, the mount duration and demounting of tape cartridges are controlled as described herein. In this first implementation, the front store of the 3850 is the collection of data recording devices (rotary head data tape recorders) and the back store is the library configuration, such as shown in FIG. 1 of this application. In the first IBM 3850 implementation, a data unit is one IBM 3850 tape cartridge that stores one-half of a IBM 3330 virtual disk volume. Promotion of a data unit consists of transporting one tape cartridge from a library compartment to an addressed one of the data recording devices. Demotion of a data unit comprises transporting a mounted tape cartridge from one of the data recording devices to its assigned library compartment.

The invention can also be applied to the front store of the IBM 3850 (consisting of a plurality of DASD) and the electronic transfer of data units between the DASD and the tape cartridges mounted in the data recording devices. The back store to this implementation includes the data recording devices and the 3850 library configuration. The 3850 DASD's are the front store. A data unit in this latter arrangement is eight cylinders of 3330 virtual volume data storage space. Such eight cylinders can be termed a "segment of data storage space" (hereinafter segment).

Coordination between the two implementations of this invention to different levels of the 3850 data storage hierarchy may include giving all priority for demounting data units in the two implementations to the first IBM 3850 library implementation. This described coordination means that tape cartridges can be demounted independently of whether or not any promoted segment in the 3850 DASD front store is a part of a tape cartridge that is to be demounted or is currently demounted. If a segment is to be demoted to its tape cartridge, that demotion may require sending a data access request to the IBM 3850 library to promote such tape cartridge to a data recording device before the demotion of the segment can be accomplished. In this latter instance, the actual IBM 3850 front store appears as a host system 10 (FIG. 1) to the 3850 back store (library). The host system to the 3850 DASD front store is the attaching host processors to the 3850.

If the front or higher level of a data storage hierarchy includes volatile data storage, then the demotion of data units to remanent data storage can take precedence over the operation of this invention at lower data storage levels of the data hierarchy.

The terminology used to describe the program elements shown in FIGS. 2 and 4 uses language followed in the programming arts that the program element performs the recited machine operations. Actually, the program elements are, per se, passive data elements that are sensed by processor 16. Processor 16 response to the sensed program elements to actuate controller 11 machine operations as is well known.

While the invention has been particularly shown and described with reference to preferred embodiments thereof, it will be understood by those skilled in the art that various changes in form and details may be made therein without departing from the spirit and scope of the invention.

What is claimed is:

1. A machine-executed method of managing data unit transfers between a back store and a front store of a data-storage subsystem, a large plurality of addressable data units in said back store, each data unit for storing a respective predetermined number of data bytes, the machine-executed method including machine-executed steps of:

in said subsystem, promoting predetermined data units from the back store to the front store for storing data in said front store as promoted data units;

in said front store, repeatedly accessing said promoted data units;

in said front store, monitoring said repeated accessing to each of the promoted data units for respectively detecting and memorizing in a data store said monitored accessing to the respective promoted data units for generating a determined data access frequency as an access pattern of said promoted data units, respectively;

in said front store, establishing respective predetermined frequency of data access criteria for each of said data units for determining eligibility of each one of said data units to be demoted from said front store to said back store only if said respective predetermined frequency data access criteria are greater than a determined data access frequency of said data units, respectively, making said identified promoted data units eligible data units for demotion;

in said front store, indicating that one of said promoted data units is to be demoted from the front store to the back store; and in said subsystem, responding to said indicating to respectively compare said access patterns of each of said promoted data unit with said data access criteria for each of said promoted data units, if none of said comparisons indicate that any of said promoted data units have a memorized access pattern exceeding its respective access criteria, then indicating that none of said promoted data units are eligible for demotion for not demoting any of said promoted data units, otherwise, demoting said one of said promoted data units having a memorized accessing pattern exceeding said respective data access criteria from said front store to said back store.

2. A machine-effected method set forth in claim 1, further including machine-executed steps of:

selecting said data units to be respective transportable data-storage media;

providing in said back store a plurality of addressable media storage compartments, each said media storage compartment for storing at least one of said data-storage media;

providing in said front store a plurality of media drives for yieldably mounting respective ones of said data-storage media, connecting the front store to said back store for exchanging said data-storage media between said front and back stores;

demounting data-storage media mounted in one of said plurality of media drives;

providing means for automatically storing and transporting said data-storage media between said compartments and said media drives; and in said promoting step, transporting said data-storage media from said compartments, respectively, for mounting predetermined ones of said data-storage media in respective ones of said media drives.

3. A machine effected method set forth in claim 2, further including machine executed steps of:

in said subsystem, continuously generating a current time indication;

in said front store, detecting and recording in said data store said current time indication as a time of mounting of each of said data-storage media into respective ones of said media drives;

in said subsystem, generating an idle horizon elapsed time for each of said data-storage media, storing in said data store said generated idle horizon elapsed times for representing said predetermined frequency of data access criteria;

in said monitoring step, detecting and counting each said accessing to said mounted data-storage media for creating an access count for each of said mounted data-storage media, then storing said access counts in said data store;

in said monitoring step, recording in said data store said current time for indicating a time of access to each of said mounted data-storage media for storing in said data store said time of access as a most recent access for each of said mounted data-storage media;

for each of said mounted data-storage media, subtracting said most recent access time stored in said data store from said current time indication for generating a current idle time indication;

for each of said mounted data-storage media, in said comparing step of said responding step, respectively comparing said idle horizon elapsed times with said current elapsed idle time indications to identify predetermined ones of said mounted data-storage media as eligible to be demounted, selecting said one of said eligible data-storage media to be an available data unit for demotion; and in said demoting step, demoting said available data unit from a respective one said media drives.

4. A machine-effected method set forth in claim 3, further including, in said demoting step, making said idle horizon time of said available data unit a current idle horizon time, then, generating a new idle horizon time for said available data unit, including machine-executed steps of:

physically removing said available data unit from said front store media drive and indicating that said available data unit has been demounted in a predetermined time after machine executing said responding step;

detecting and indicating whether or not said most recent access times for predetermined ones of said mounted data-storage media other than said available data unit are within said predetermined time of demounting said available data unit, if said last access times of said predetermined ones of said media drives are all within said predetermined time of demounting said available data unit, then generating said new idle horizon time for said available data unit including decreasing the idle horizon time by a first predetermined value for generating said new idle horizon time, otherwise, increasing said current idle horizon time by a second predetermined value for generating said new idle horizon time, and storing said new horizon time in said data store.

5. A machine-effect method set forth in claim 4, including machine-executed steps of:

in said step for increasing said current idle horizon time for said available data unit, summing said current idle time and said current horizon time, then halving the sum for generating said new horizon time; and in said step for decreasing said current horizon time, halving said current horizon time for generating said new horizon time.

6. A machine-effected method set forth in claim 4, including machine-executed steps:

in said step for increasing said current horizon time for said available data unit, taking a predetermined time portion of said current idle time for generating said new horizon time.

7. A machine-effected method set forth in claim 3, including machine-executed steps of:

finding a plurality of said promoted data-storage media respectively having current idle times greater than said idle horizon times, identifying said plurality of promoted data-storage media as said eligible data units;

for each eligible data unit, dividing said access count by said current idle time for generating a frequency of usage;

finding one of said eligible data units having a least frequency of usage (LFU) of any of said eligible data units; and selecting said LFU one of said eligible data units to be said available data unit.

8. A machine-effected method set forth in claim 3, including machine-executed steps of:

in said front store;

establishing a queue of data units to be promoted;

repeatedly generating requests for promoting respective given ones of said data units from said back store to said front store;

storing said requests in said queue for identifying said data units to be promoted;

generating a time out indication every T seconds;

responding to said time out indication to sense said queue, if said queue has a stored request, then performing said indicating step that indicates one of said promoted data units is to be demoted.

9. A machine-effected method set forth in claim 8, including machine-executed steps of:

finding a plurality of said promoted data units respectively having a current idle time greater than said idle horizon times, identifying said plurality of data units as said eligible data units;

for each said eligible data unit, dividing said access count by said current idle time for generating a frequency of usage;

finding one of said eligible data units having a least frequency of usage (LFU) of any of said eligible data units; and selecting said LFU one of said eligible data units to be said available data unit.

10. A machine-effected method set forth in claim 9 including machine-executed steps of:

after said generating a request to promote a data unit and before storing said generated request in said queue, sensing said queue, if said queue has a stored request, then storing the generated request in said queue and reading said stored request as a next data unit to be promoted from said back store to said front store, then performing said indicating step that indicates one of said promoted data units is to be demoted.

11. A machine-effected method set forth in claim 10, including machine-executed steps of:

providing an electronic cache in said front store, connecting the cache to all of said media drives;

promoting data from said mounted data units to said cache;

receiving an data access request for data in a given one of said data units;

responding to the data access request to first examine said cache for determining whether or not said data access request is for data stored in the cache, if yes, accessing the cache to access the data of said given one of said data units for responding to said data access request;

adding said accessing the cache to said access count of said given one of said data units.

12. A machine-effected method set forth in claim 10, including machine-executed steps of:

in said subsystem, generating a demote request having an indication of a specific data unit for demote said specific data unit;

in said front store verifying that said specific data unit is one of said promoted data units;

in said front store, if said specific data unit is one of said promoted data units, then Sensing said queue for stored requests to promote a data unit; and upon finding no stored requests in said queue, deferring demoting said specific data unit.

13. A machine-effected method set forth in claim 3, including machine-executed steps of:

providing first and second recording surfaces on each of said data storage media;

in said subsystem, making each of said recording surfaces one of said data units;

in said front store; establishing a queue of said data units to be promoted;

repeatedly generating requests for promoting respective given ones of said data units from said back store to said front store;

storing said requests in said queue for identifying said data units to be promoted;

generating a time out indication every T seconds;

responding to said time out indication to sense said queue, if said queue has a stored request, then performing said indicating step that indicates one of said promoted data units is to be demoted;

in said demoting step, examining all of said promoted data units for determining whether or not said data unit to be promoted is a recording surface on a same disk as another one of said promoted data units, if yes, then determining whether or not said another data unit is eligible for demotion, if yes, then demoting both said available data unit and said another data unit.

14. A machine-effected method set forth in claim 3, including machine-executed steps of:

in said subsystem, generating a demote request having an indication of a specific data unit for demote said specific data unit;

in said front store verifying that said specific data unit is one of said promoted data units;

in said subsystem, responding to said verifying that said specific data unit is one of said promoted data units to compare said access patterns of said specific data unit with said data access criteria for said specific data unit, if said comparison indicates that said specific data unit has a memorized access pattern indicating a frequency of data access less than its respective access criteria such that said specific data unit is not eligible for demotion, then making said specific data unit eligible for demotion.

15. A machine-effected method set forth in claim 3, further including, in said demoting step, making said idle horizon time of said available data unit a current idle horizon time, then, generating a new idle horizon time for said available data unit, including machine-executed steps of:

in said demoting step, indicating a time that said available data unit has been demoted;

detecting and indicating whether or not said most recent access times for predetermined ones of said promoted data units other than said available data unit are within a predetermined time of said time of demoting said available data unit, if said last access times of said predetermined ones of said promoted data units are all within said predetermined time of said demoting time of said available data unit, then generating said new idle horizon time for said available data unit including decreasing the idle horizon time by a first predetermined value for generating said new idle horizon time, otherwise, increasing said current idle horizon time by a second predetermined value for generating said new idle horizon time, and storing said new horizon time in said data store.

16. A machine-effected method set forth in claim 1, including machine-executed steps of:

in said subsystem, continuously generating a current time indication;

in said front store, detecting and recording in said data store said current time indication as a time of promoting each of said promoted data units to said front store;

in said subsystem, generating an idle horizon elapsed time for each of said data units, storing in said data store said generated idle horizon elapsed times for representing said predetermined frequency of data access criteria for the respective data units;

in said monitoring step, detecting and counting each said accessing to said promoted data units for creating an access count for each of said promoted data units, then storing said access counts in said data store;

in said monitoring step, recording in said data store said current time for indicating a time of access to each of said promoted data units for storing in said data store said time of access as a most recent access for each of said promoted data units;

for each of said promoted data unit, subtracting said most recent access time stored in said data store from said current time indication for generating a current idle time indication;

for each of said promoted data units, in said comparing step of said responding step, respectively comparing said idle horizon elapsed times with said current elapsed idle time indications to identify predetermined ones of said promoted data units as eligible to be demoted, selecting said one of said eligible promoted data units to be an available data unit for demotion; and in said demoting step, demoting said available data unit.

17. A machine-effected method set forth in claim 16, including machine-executed steps of:

in said step for increasing said current idle horizon time for said available data unit, summing said current idle time and said current horizon time, then halving the sum for generating said new horizon time;

in said step for decreasing said current horizon time, halving said current horizon time for generating said new horizon time; and in said step for increasing said current horizon time for said available data unit, taking a predetermined time portion of said current idle time for generating said new horizon time.

18. A machine-effected method set forth in claim 16, including machine-executed steps of:

finding a plurality of said promoted data units respectively having current idle times greater than said idle horizon times, identifying said plurality of promoted data-storage media as said eligible data units;

for each eligible data unit, dividing said access count by said current idle time for generating a frequency of usage;

finding one of said eligible data units having a least frequency of usage (LFU) of any of said eligible data units; and selecting said LFU one of said eligible data units to be said available data unit.

19. A machine-effected method set forth in claim 18, including machine-executed steps of:

in said front store;

establishing a queue of data units to be promoted;

repeatedly generating requests for promoting respective given ones of said data units from said back store to said front store;

storing said requests in said queue for identifying said data units to be promoted;

generating a time out indication every T seconds;

responding to said time out indication to sense said queue, if said queue has a stored request, then performing said indicating step that indicates that said one of said promoted data units is to be demoted.

20. A machine-effected method set forth in claim 16, including machine-executed steps of:

finding a plurality of said promoted data units respectively having a current idle time greater than said idle horizon times, identifying said plurality of data units as said eligible data units;

for each said eligible data unit, dividing said access count by said current idle time for generating a frequency of usage;

finding one of said eligible data units having a least frequency of usage (LFU) of any of said eligible data units; and selecting said LFU one of said eligible data units to be said available data unit.

21. A machine-effected method set forth in claim 20 including machine-executed steps of:

in said front store, indicating that predetermined ones of said promoted data units eligible for demotion are given data units that are not to be demoted; and if said selecting step, before selecting said available data unit, examining said given data units for determining whether said LFU one of the eligible data units is indicated as being one of said given data units. if yes, then selecting another one of said eligible promoted data units to be said available data unit.

22. A data storage subsystem having a back store and a front store, a large plurality of addressable data units in said back store, each data unit for storing a respective predetermined number of data bytes, data units in said front store being promoted data units, promote-demote means connected to said stores for promoting data units from the back store to the front store and for demoting promoted ones of said data units in said front store to said back store, including, in combination:

data access means in the front store for repeatedly accessing said promoted data units;

monitoring means connected to said data access means for monitoring said repeated accessing to each of said promoted data units for respectively detecting said monitored data accessing to the respective promoted data units for generating a determined data access frequency as an access pattern of said promoted data units, respectively;

a data store connected to the monitoring means for receiving and storing said generated access patterns for each of said promoted data units;

eligibility means connected to said data store for establishing respective predetermined frequency of data access criteria for each of said data units for indicating eligibility of each one of said data units to be demoted from said front store;

control means connected to said front store for indicating that one of said promoted data units is to be demoted from the front store to the back store; and demount means connected to said control means, to said data store, to said eligibility means for responding to said control means indicating one of said promoted data units is to be demoted for respectively comparing said access patterns of each of said promoted data units with said data access criteria for each of said promoted data units;

retain means in said demount means responsive to said comparisons not indicating that any of said promoted data units have a memorized access pattern exceeding its respective access criteria, then indicating that none of said promoted data units are eligible for actuating said demount means not to demote any of said promoted data units, otherwise, for actuating said demount means to demote said one of said promoted data units having a memorized accessing pattern exceeding said respective data access criteria from said front store to said back store.

23. The subsystem set forth in claim 22, further including, in combination:

a first plurality of data-storage media, each having a recording surface that includes respective ones of said data units;

said back store including a second plurality of addressable media storage compartments, each said media storage compartment for storing a respective one of said data-storage media;

a third plurality of media drives in said front store for yieldably mounting respective ones of said data-storage media;

transport means interposed between said media storage compartments and said media drives for transporting said media between said media storage compartments and said media drives;

a clock for continuously generating a current time indication;

mount time means connected to said clock and to said media drives for detecting and recording in said data store said current time indication each said data-storage media are promoted from said back store into respective ones of said media drives;

horizon means connected to said data store for generating an idle horizon elapsed time for each of said data units and storing in said data store said generated idle horizon elapsed times for representing said predetermined frequency of data access criteria;

said monitoring means including counting means for counting each said accessing to said promoted data units for creating an access count for each of said mounted data-storage media, then storing said access counts in said data store;

said monitoring means having current time means connected to said clock for recording in said data store said current time for indicating a time of access to each of said mounted data-storage media for storing in said data store said time of access as a most recent access for each of said mounted data-storage media;

idle time means connected to said clock and to said data store for calculating a current idle time indication for each of said promoted data units including means for subtracting said most recent access time stored in said data store from said current time indication of said clock to generate said current idle time indication;

said demount means having responding means connected to said idle time means for respectively comparing said idle horizon elapsed times with said current idle time indications to identify predetermined ones of said promoted data units as said eligible data units; and selecting means in said demount means for selecting said one of said eligible promoted data units to be an available data unit for demotion.

24. The subsystem set forth in claim 23, further including:

said select means having usage means connected to the responding means identifying a plurality of said promoted data units as eligible promoted data units for finding one of said eligible data units having a lowest usage;

said usage means having dividing means for accessing said access counts and said current idle time of each said eligible data unit to divide said access count by said current idle time for generating a frequency of usage indication for each of said eligible data units;

least means in said usage means connected to said dividing means for finding one of said eligible data units having a least frequency of usage (LFU) of any of said eligible data units; and said selecting means connected to said least means for receiving said identification of said LFU one of said eligible data units for selecting said LFU eligible data unit to be said available data unit.

25. The subsystem set forth in claim 23, further including:
- said select means indicating a time of selection of said available data unit for demotion;
- demount indicating means in said demount means and connected to said select means for indicating that said available data unit has been demoted and a time of demotion from said front store by physically removing said available data unit from said front store and indicating a predetermined elapsed time between said time of selection and said time of demotion;
- new horizons means connected to said demount indicating means for responding to said indication of demotion of said available data unit for generating a new idle horizon time to replace a current said idle horizon time of said available data unit;
- optimum demount means in said new horizons means for detecting whether or not predetermined current idle times of predetermined ones of said promoted data units other than said available data unit are less than said predetermined elapsed time of demounting said available data unit, said optimum demount means generating a first indication if said predetermined idle times are all less than said predetermined elapsed time and a second indication if less than all of said predetermined current idle times are less than said predetermined elapsed time;
- decrease means in said optimum demount means responsive to said first indication for decreasing said current idle horizon time by a first predetermined value for generating said new idle horizon time;
- increase means in said optimum demount means responsive to said second indication for increasing said current idle horizon time by a second predetermined value for generating said new idle horizon time; and
- storing means connected to said decrease means, to said increase means and to said data store for storing said new horizon time in said data store.

26. The subsystem set forth in, claim 25, further including:
- said decrease means having first calculation means having a first predetermined calculation procedure for taking a predetermined portion of said current idle horizon time of said available data unit for generating said new horizon time; and
- said increase means having second calculation means having a second calculation procedure for taking a predetermined portion of said current idle time of said available data unit as said new horizon time.

27. The subsystem set forth in claim 22, further including:
- clock means for generating a time out indication every T seconds;
- queue means connected to said demount means and to said data store means for queuing identifications of data units to be promoted from said back store to said front store;
- cycling means in the queue means and connected to said clock means for responding to said T second time out to actuate the queue means to sense said queue;
- said queue means having Output means connected to said control means and being responsive to said sensing of an identified data unit to be promoted for actuating said control means to indicate that one of said promoted data units is to be demoted from said front store; and
- input means connected to said queue means for supplying identifications of data units for insertion into said queue.

28. A program element for use in a data storage subsystem, said subsystem having a front store connected to a back store, a plurality of data units in said back store that are promotable to said front store, each said data unit for storing a predetermined number of bytes of data, promote-demote means connecting said front and back stores, said data units promoted to said front store being promoted data units, data access means connected to the front store for repeatedly accessing said promoted data units, a data store for storing control data of said data storage subsystem, said program element comprising:
- a memory;
- monitoring means in said memory for instructing monitoring said repeated accessing to each of said promoted data units for respectively detecting said monitored data accessing to the respective promoted data units for generating a determined data access frequency as an access pattern of said promoted data units, respectively;
- data store means in said memory for instructing the data store for receiving and storing said generated access patterns for each of said promoted data units;
- eligibility means in said memory for instructing establishing respective predetermined frequency of data access criteria for each of said data units for indicating eligibility of each one of said promoted data units to be demoted from said front store;
- control means in said memory for instructing indicating that one of said promoted data units is to be demoted from the front store to the back store; and
- demount means in said memory for instructing respectively comparing said access patterns of each of said promoted data units with said data access criteria for each of said promoted data units;
- retain means in said memory for instructing indicating that none of said promoted data units having a memorized access pattern exceeding its respective access criteria such that said none of said promoted data units are eligible for demotion otherwise instructing demoting said one of said promoted data units having a memorized accessing pattern exceeding said respective data access criteria from said front store to said back store.

29. The program element set forth in claim 28, further including:
- said eligibility means further for instructing identifying eligible ones of said promoted data units as being those promoted data units having a frequency of access less than said predetermined frequency of accesses, respectively;
- select means in said memory for instructing the selection of one of said eligible ones of said data units as an available data unit to be demoted;
- said select means having usage means in said memory instructing comparing the access frequencies of said eligible data units for finding a least frequent accessed one of said eligible data units and instructing selecting the lease frequent accessed done of said eligible data units to be said available data unit; and said demount means further for instructing demoting said available data unit.

30. A machine-executed method of managing a back store connected to a front store, a large plurality of addressable data units in said back store promotable to said front store and for storing a respective predetermined number of data bytes, including machine-executed steps of:

promoting predetermined data units from said back store to said front store for storing data in said front store as promoted data units;

in said front store, repeatedly accessing said promoted data units;

in said front store, respectively first indicating in a data store portion of said front store a respective minimum elapsed time for said promoted data units that the respective promoted data unit is to be in said front store before being eligible for cast out from the front store;

in said front store, respectively monitoring elapsed times of said promoted data units without being accessed by any one of said repeated accesses, storing each of said monitored elapsed times in said data store portion of said front store;

in said front store, second indicating that a given one of said promoted data units is to be cast out from the front store; and in said front store, responding to said second indicating to respectively compare said monitored elapsed times with respective ones of said minimum elapsed times for respectively determining eligibility for cast out of said promoted data units; and if none of said promoted data units are determined to be eligible for cast out, then delaying said cast out of said given one promoted data unit and repeating said responding step until an eligible promoted data unit is determined to be eligible for cast out, otherwise, if one or more eligible data units are determined to be eligible for cast out, then selecting a predetermined one of said determined eligible promoted data units to be said given one promoted data unit, then casting out said given one promoted data.

31. A machine-effected method set forth in claim 30, further including machine-executed steps of:

establishing a separate minimum elapsed time for each of said data units in the front and back stores, storing all of said minimum elapsed times in said data store;

detecting and indicating a time of cast out of said given one of said promoted data units;

establishing a recent-access measurement time period for all of said promoted data units that has a predetermined time of occurrence with respect to said time of cast out;

detecting, during said measurement time period, every access to any of said promoted data units; and if none of said promoted data units other than said given one data unit had a data access during said measurement time period, then increasing said minimum elapsed time for said given one data unit, otherwise decreasing said minimum elapsed time for said given one data unit.

* * * * *